US008158873B2

(12) United States Patent
Ivanich

(10) Patent No.: US 8,158,873 B2
(45) Date of Patent: Apr. 17, 2012

(54) SYSTEMS AND METHODS FOR GENERATING A GAME DEVICE MUSIC TRACK FROM MUSIC

(76) Inventor: William Ivanich, Parker, CO (US)

( * ) Notice: Subject to any disclaimer, the term of this patent is extended or adjusted under 35 U.S.C. 154(b) by 145 days.

(21) Appl. No.: 12/534,727

(22) Filed: Aug. 3, 2009

(65) Prior Publication Data

US 2011/0023689 A1 Feb. 3, 2011

(51) Int. Cl.
*G10H 7/00* (2006.01)
(52) U.S. Cl. .......... 84/610; 84/611; 84/616; 84/635
(58) Field of Classification Search .......... 84/610
See application file for complete search history.

(56) References Cited

U.S. PATENT DOCUMENTS

| | | | |
|---|---|---|---|
| 5,627,335 A | 5/1997 | Rigopulos et al. | |
| 5,763,804 A | 6/1998 | Rigopulos et al. | |
| 5,850,051 A | 12/1998 | Machover et al. | |
| 5,925,843 A * | 7/1999 | Miller et al. | 84/609 |
| 5,990,405 A | 11/1999 | Auten et al. | |
| 6,011,212 A | 1/2000 | Rigopulos et al. | |
| 6,225,547 B1 * | 5/2001 | Toyama et al. | 84/611 |
| 6,252,153 B1 | 6/2001 | Toyama | |
| 6,342,665 B1 | 1/2002 | Okita et al. | |
| 6,347,998 B1 | 2/2002 | Yoshitomi et al. | |
| 6,353,174 B1 | 3/2002 | Schmidt et al. | |
| 6,390,923 B1 | 5/2002 | Yoshitomi et al. | |
| 6,429,863 B1 | 8/2002 | LoPiccolo et al. | |
| 6,482,087 B1 | 11/2002 | Egozy et al. | |
| 6,638,160 B2 | 10/2003 | Yoshitomi | |
| 6,645,067 B1 | 11/2003 | Okita et al. | |
| 6,659,873 B1 | 12/2003 | Kitano et al. | |
| 6,695,694 B2 | 2/2004 | Ishikawa et al. | |
| 6,786,821 B2 | 9/2004 | Nobe et al. | |
| 6,821,203 B2 | 11/2004 | Suga et al. | |
| 6,905,413 B1 | 6/2005 | Terao et al. | |
| 6,915,488 B2 | 7/2005 | Omori et al. | |
| 7,128,649 B2 | 10/2006 | Nobe et al. | |
| 7,320,643 B1 | 1/2008 | Brosius et al. | |
| 7,459,624 B2 | 12/2008 | Schmidt et al. | |
| 2005/0215319 A1 | 9/2005 | Rigopulos et al. | |
| 2006/0058101 A1 | 3/2006 | Rigopulos | |
| 2006/0196343 A1 * | 9/2006 | Yung | 84/470 R |
| 2006/0266200 A1 * | 11/2006 | Goodwin | 84/611 |
| 2007/0156267 A1 | 7/2007 | Nozaki | |
| 2007/0163427 A1 * | 7/2007 | Rigopulos et al. | 84/609 |
| 2007/0232374 A1 | 10/2007 | Lopiccolo et al. | |
| 2007/0243915 A1 | 10/2007 | Egozy et al. | |
| 2007/0245881 A1 | 10/2007 | Egozy et al. | |
| 2008/0113698 A1 | 5/2008 | Egozy | |

(Continued)

*Primary Examiner* — Jeffrey Donels
*Assistant Examiner* — Christopher Uhlir
(74) *Attorney, Agent, or Firm* — Lowe Graham Jones PLLC

(57) ABSTRACT

Game player performance information systems and methods generate game player performance information. An exemplary embodiment receives a specification of an audio track of interest; receives a specification of a musical instrument, wherein the musical instrument corresponds to an instrument simulation device that a game player operates when playing the musical game; determines an instrument audio track based upon the audio track of interest, wherein the instrument audio track corresponds to music played by the specified musical instrument during the recording of the audio track of interest; generating a plurality of instrument notes based upon the instrument audio track; generates a plurality of game play notes based upon the instrument notes; and generates game player performance information based upon the game play notes, wherein the game player performance information identifies the sequence of specific player actions for the game player to make during playback of the audio track of interest.

21 Claims, 3 Drawing Sheets

U.S. PATENT DOCUMENTS

| | | |
|---|---|---|
| 2008/0113797 A1 | 5/2008 | Egozy |
| 2008/0161078 A1 | 7/2008 | Nakano et al. |
| 2008/0188305 A1 | 8/2008 | Yamazaki et al. |
| 2008/0220864 A1 | 9/2008 | Brosius et al. |
| 2008/0248847 A1 | 10/2008 | Nakano et al. |
| 2008/0311969 A1 | 12/2008 | Kay et al. |
| 2009/0042650 A1 | 2/2009 | Chiwata |
| 2009/0082078 A1 | 3/2009 | Schmidt et al. |
| 2009/0104997 A1 | 4/2009 | Ishida et al. |
| 2009/0165632 A1 | 7/2009 | Rigopulos et al. |
| 2009/0176575 A1 | 7/2009 | Terao et al. |

* cited by examiner

SYSTEMS AND METHODS FOR GENERATING A GAME DEVICE MUSIC TRACK FROM MUSIC

BACKGROUND

Various interactive music games are available where the game player, using an instrument-like play device, simulates playing a corresponding musical instrument to a game music track. For example, Guitar Hero®, GuitarFreaks® and Drummania® are music games that score the game player's ability to simulate the playing of a musical score or song using their instrument simulation device. The instrument simulation device is a game controller that simulates, for example, a guitar, a drum set, or any other musical instrument.

For example, in a guitar game, the game player uses a guitar-shaped controller to simulate the playing of a lead guitar, a bass guitar, or a rhythm guitar in a manner that "simulates" the playing of a particular musical score or song. The game player attempts to match a series of musical notes that are scrolled on-screen by selectively actuating fret buttons on the neck of their guitar-shaped controller while strumming a device in time to the musical score or song. The degree of correspondence between the depression of the fret buttons while strumming, and optionally other actions by the game player, with predefined criteria associated with the played musical score or song allows the game player to score game points. The interactive music games attempt to mimic features of playing a real guitar, including the use of fast-fingering hammer-ons and pull-offs and the use of the whammy bar to alter the pitch of notes being played during the musical score or song.

An exemplary interactive music game is described in U.S. Pat. No. 5,990,405 to Yoshitomi et al., entitled "Game System and Computer-Readable Recording Medium" and issued on Feb. 19, 2002. The Yoshitomi interactive music game uses performance data stipulating a series of manipulations of the input apparatus arranged in correspondence with a predetermined musical piece where the game player's performance is determined based upon a correspondence between the game player's operation of the guitar-shaped controller and the performance data.

Another exemplary interactive music game is described in U.S. patent application Ser. No. 11/311,707, published as US 2007/0163427, to Rigopulos et al., entitled "System and Method Generating Video Game Content" and filed on Dec. 19, 2005. The Rigopulos interactive music game system includes analyzing musical content to identify at least one musical event extant in the musical event; determining a salient musical property associated with the at least one identified event; and creating a video game event synchronized to the at least one identified musical event and reflective of the determined salient musical property associated with the at least one identified event. Audio events or transients from an audio signal containing music may be used to identify musical events and determine properties associated with those events. Accordingly, various characteristics of a selected musical score or song are analyzed to determine characteristics that are used to define the performance data which the game player must satisfy to score game points. Some interactive music games provide ways to modify the performance data.

In the various available interactive music games, the game player must first obtain a musical score or song, along with the predefined performance data, in order to play their interactive music game. Musical scores or songs, and their associated performance data, may be provided with the interactive music game software, may be separately acquired on a media such as a compact disk, or downloaded from a site accessible via the Internet. Typically, the game player must spend money to acquire the musical score or song, and its associated performance data.

Typically, a musical score or song may have been created using a variety of different musical instruments. For example, in addition to sounds from a guitar, a rock and roll score or song may have sounds generated by drums, a base guitar, a piano, a saxophone, etc. However, the game player may desire to play the game based upon a musical instrument that has not been included in the predefined performance data for that particular musical score or song.

Further, selection of musical scores or songs is limited to popular musical scores or songs that have been processed to prepare the associated predefined performance data. Thus, the game player may be interested in playing the interactive music game using a musical score or song that has not been processed to define the performance data. A favorite musical score or song of interest of the game player may be readily available on a record, on a compact disc, the radio, the Internet, or the like. However, if no performance data is available for that particular musical score or song of interest, the interactive music game cannot be played using that musical score or song.

In some instances, the interactive music game may be more fun and or challenging for the game player if the game player is familiar with the particular musical score or song that the game play is based upon. That is, it is likely to be little or no fun for the game player to try to simulate play of a musical score or song that they are unfamiliar with. And, playing the interactive music game for a first time can be very frustrating if the game player has no pre-knowledge of the played musical score or song, and/or if the game player dislikes the played musical score or song.

Accordingly, there is a need in the arts to provide performance data for musical scores or songs that the game player is familiar with and/or likes, particularly when a particular musical score or song that the game player wishes to play is readily available from a remote source.

SUMMARY

Systems and methods of generating game player performance information are disclosed. An exemplary embodiment has a program content stream interface configured to receive at least a plurality of audio tracks from a remote source, a memory, and a processor system communicatively coupled to the program content stream interface and the memory. The processor system is configured to receive a specification of an audio track of interest selected from the plurality of received audio tracks; receive a specification of a musical instrument, wherein the musical instrument corresponds to an instrument simulation device that a game player operates when playing the musical game; determine an instrument audio track based upon the audio track of interest, wherein the instrument audio track corresponds to music played by the specified musical instrument during a recording of the audio track of interest; generate a plurality of instrument notes based upon the instrument audio track; generate a plurality of game play notes based upon the instrument notes; and generate game player performance information based upon the game play notes, wherein the game player performance information identifies the sequence of specific player actions for the game player to make during playback of the audio track of interest.

In accordance with further aspects, an exemplary embodiment receives a specification of an audio track of interest;

receives a specification of a musical instrument, wherein the musical instrument corresponds to an instrument simulation device that a game player operates when playing the musical game; determines an instrument audio track based upon the audio track of interest, wherein the instrument audio track corresponds to music played by the specified musical instrument during the recording of the audio track of interest; generating a plurality of instrument notes based upon the instrument audio track; generates a plurality of game play notes based upon the instrument notes; and generates game player performance information based upon the game play notes, wherein the game player performance information identifies the sequence of specific player actions for the game player to make during playback of the audio track of interest.

BRIEF DESCRIPTION OF THE DRAWINGS

Preferred and alternative embodiments are described in detail below with reference to the following drawings.

DETAILED DESCRIPTION

Figure 1:
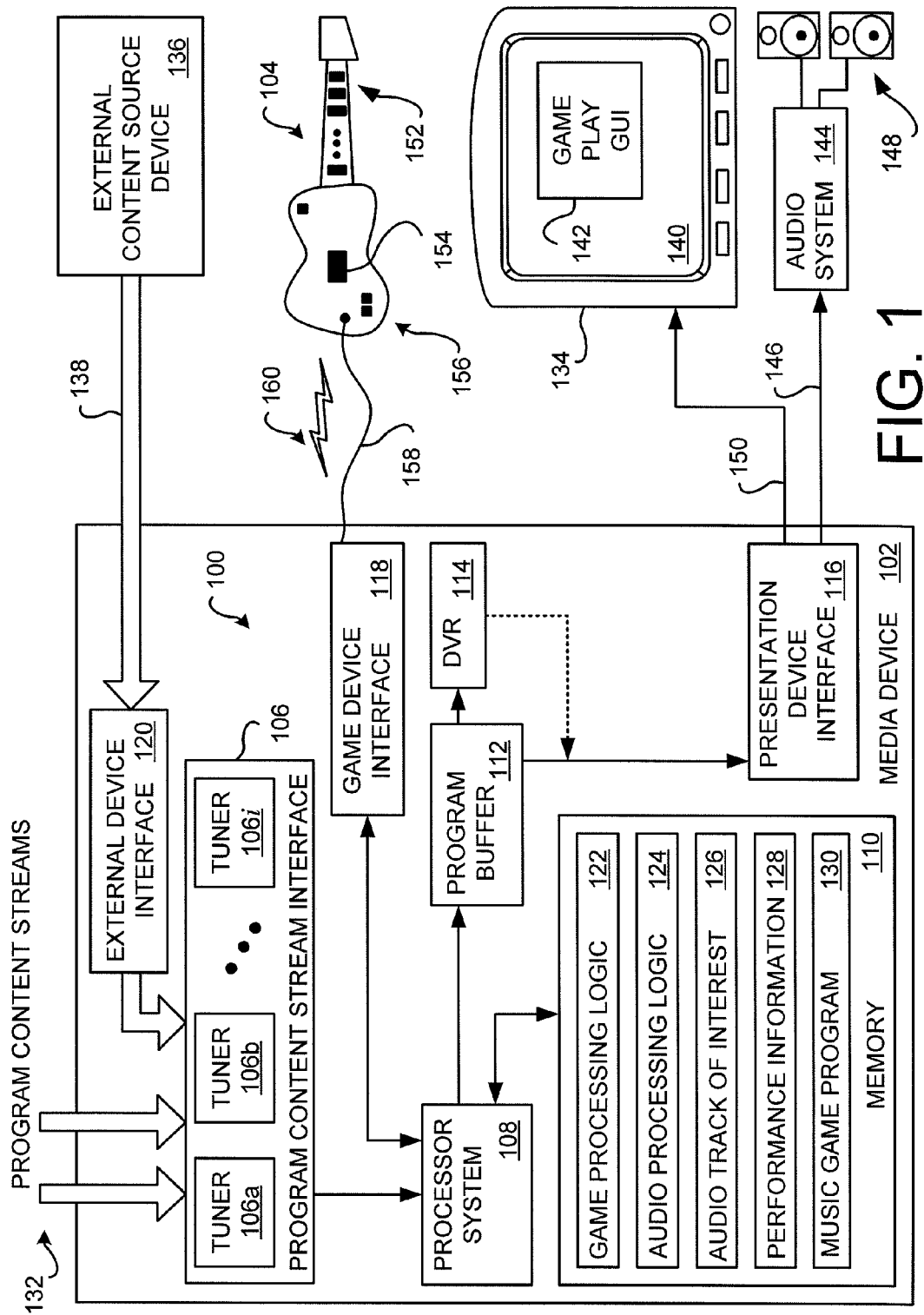
FIG. 1 is a block diagram of an embodiment of the game play audio track generation system.

FIG. 1 is a block diagram of an embodiment of the game play performance information system 100. An exemplary embodiment of the game play performance information system 100 is implemented in a media device 102, such as, but not limited to, a set top box (STB). Embodiments of the game play performance information system 100 may be implemented in other media devices, such as, but not limited to, stereos, radios, televisions (TVs), digital video disc (DVD) players, digital video recorders (DVRs), cellular phones equipped with video functionality, personal device assistants (PDAs), or personal computers (PCs) that are configured to play a music game that determines performance of the game player based upon the game player's manipulation of controllers on an instrument simulation device 104. In this exemplary embodiment, the instrument simulation device 104 corresponds to a guitar.

The non-limiting exemplary media device 102 comprises a program content stream interface 106, a processor system 108, a memory 110, a program buffer 112, an optional digital video recorder (DVR) 114, a presentation device interface 116, an optional game device interface 118, and an optional external device interface 120. The memory 110 comprises portions for storing the game processing logic 122, the audio processing logic 124, the audio track of interest 126, the performance information 128, and optionally, the game program 130. In some embodiments, the game processing logic 122 and the audio processing logic 124 may be integrated together, and/or may be integrated with other logic. Other media devices may include some, or may omit some, of the above-described media processing components. Further, additional components not described herein may be included in alternative embodiments.

Embodiments of the game play performance information system 100 are configured to receive a musical score or song of interest, referred to herein as the audio track of interest, and receive a specification of at least one musical instrument that was used during the creation of the audio track of interest. The game processing logic 122 is used to define various game parameters for a particular music video game that the game player performance information is being configured to be played with. The audio processing logic 124 is used to process the specified audio track of interest and generate an instrument audio track corresponding to the audio track of the specified musical instrument(s). Then, based upon the generated instrument audio track of the specified musical instrument(s), embodiments of the game play performance information system 100 generate instrument notes. A series of instrument notes correspond to, and hence define, the instrument audio track for that particular specified instrument.

The generated instrument notes are used to generate game play notes that correspond to the various controllers on the instrument simulation device. The game play notes are assembled in a series to generate game player performance information. Thus, the game player performance information identifies the sequence of specific player actions for the game player to be made during playback of the audio track of interest. The game player performance information is stored for later play into the performance information 128 region of memory 110. Optionally, the specified audio track of interest is saved into the audio track of interest 126 region of memory 110.

The game player plays the musical game by executing the music game program 130. During play of the musical game, the stored game player performance information is retrieved from the performance information 128 region of memory 110. While the audio track of interest is being listened to by the game player, which may be retrieved from the audio track of interest 126 portion of memory 110, the game player manipulates the appropriate controllers on their instrument simulation device 104. The executing music game program 130 determines the game player's score based upon the correlation between the game player's manipulation of the controllers with the game play notes of the retrieved game player performance information.

Prior art music games require previously processed audio tracks and creation of related predefined game player performance information. Typically, a plurality of processed audio tracks, and the related predefined game player performance information, are provided with the initial purchase of the music game, or are available for purchase from other sources. Further, selection of available processed audio tracks, and the related predefined game player performance information, are limited based upon the selection of made by the vendors or makers of the music game. Such acquisition of the processed audio tracks, and the related predefined game player performance information, must be done prior to game play. And, there is typically some cost associated with the acquisition of the processed audio tracks, and the related predefined game player performance information.

Using embodiments of the game play performance information system 100, the game player may specify any audio track of interest, generate the related game player performance information, and then play the music game program 130 using the audio track of interest 126. And, after acquisition of the game play performance information system 100, the game player may select any audio tracks of interest that they already own or that are within the public domain. Further, a selected audio track of interest may be conveniently processed just prior to game play.

The functionality of the media device 102, here a set top box, is now broadly described. One or more program content streams 132 are received by the program content stream interface 106 provided from a media system sourced from a remote head end facility (not shown) operated by a media provider. Non-limiting examples of such media systems include satellite systems, cable systems, and the Internet.

One or more tuners 106a-106i in the program content stream interface 106 selectively tune to one of the program content streams 132 in accordance with instructions received from the processor system 108. A program content stream 132 typically comprises a plurality of programs multiplexed together. The processor system 108, based upon a request for a program of interest specified by a user, parses out program content associated with a received program of interest. The program of interest is then assembled into a stream of video and/or audio information which may be saved into the program buffer 112 such that the program content can be streamed out to the media presentation device 134, such as the television, via the presentation device interface 116. Alternatively, or additionally, the parsed out program content may be saved into the DVR 114 for later presentation.

An audio track of interest may be received in one of the program content streams 132. Thus, the audio track of interest may be a musical score or song in a portion of an audio track of a movie. In other instances, the audio track of interest may be a musical score or song received in an audio only channel of the program content stream 132.

The optional external device interface 120 is configured to communicatively couple to an external content source device 136. The external content source device 136 provides video and/or audio content to the media device 102. Nonlimiting examples of the external content source device 136 include digital video devices (DVDs), compact disk (CD) players, radios, stereos, video cassette recorders (VCRs) and other media source devices. In some embodiments, the external content source device 136 may be an interface that communicatively couples the media device 102 to the Internet or other communication system. The external content source device 136 provides an audio content stream 138 to the media device 102. The audio content stream may optionally be paired with a video stream, as in the case of a DVD player providing a movie to the media device 102. In other embodiments, the external device interface 120 may be communicatively coupled to other components and/or directly to the processor system. For example, the external device interface may be configured to provide coupling to the Internet.

A media presentation device 134 includes a display 140 that presents video information to the game player during generation of game player performance information for a selected audio track of interest. When embodiments of the game play performance information system 100 are generating game player performance information, a game play graphical user interface (GUI) 142 may be presented on the display 140 to aid the user in operating the game play performance information system 100.

Additionally, or alternatively, the presentation device interface 116 is configured to communicatively couple to an external audio system 144. The presentation device interface 116 provides audio content 146 to the external audio system 144 which is configured to receive and play an audio track of interest during game play on the speakers 148.

In some applications, a music game program that is configured to play the music game is installed in the media device 102. When the music game is played by the game player, the corresponding music game program 130 is retrieved and executed by the processor system 108. During play, a selected audio track of interest 126 is retrieved from the memory 110 and is communicated to the media presentation device 134, and optionally, to the audio system 144 (for instance, if the media presentation device 134 itself is not used to produce the audio track of interest for listening). Many types of music games include a game video stream 150 that is concurrently presented to the game player during game play to facilitate play of the game. Such game video streams 150 are presented on the display 140.

During game play, the game player operates various controllers on their instrument simulation device 104 as the audio track of interest is played by the executing music game program 130. In the simplified example illustrated in FIG. 1, the instrument simulation device 104 corresponds to a guitar. Thus, there are a plurality of fret buttons 152 (also referred to as neck buttons) on the neck of the instrument simulation device 104, and a strum pad 154 (also referred to as a picking lever) on the body of the instrument simulation device 104. Optional controllers 156 may be provided to enable other desirable sound effects that may be simulated by the instrument simulation device 104.

The instrument simulation device 104 is communicatively coupled to the game device interface 118 using a suitable media. For example, a cord or other physical connector 158 may be used. If the instrument simulation device 104 is simulating a guitar, the connector 158 may have the look and feel of a guitar cord. Alternatively, or additionally, the instrument simulation device 104 may communicate wireless signals 160 to the game device interface 118. Examples of a suitable wireless signal 160 may include a radio signal (RF) or an infrared signal.

Figure 2:
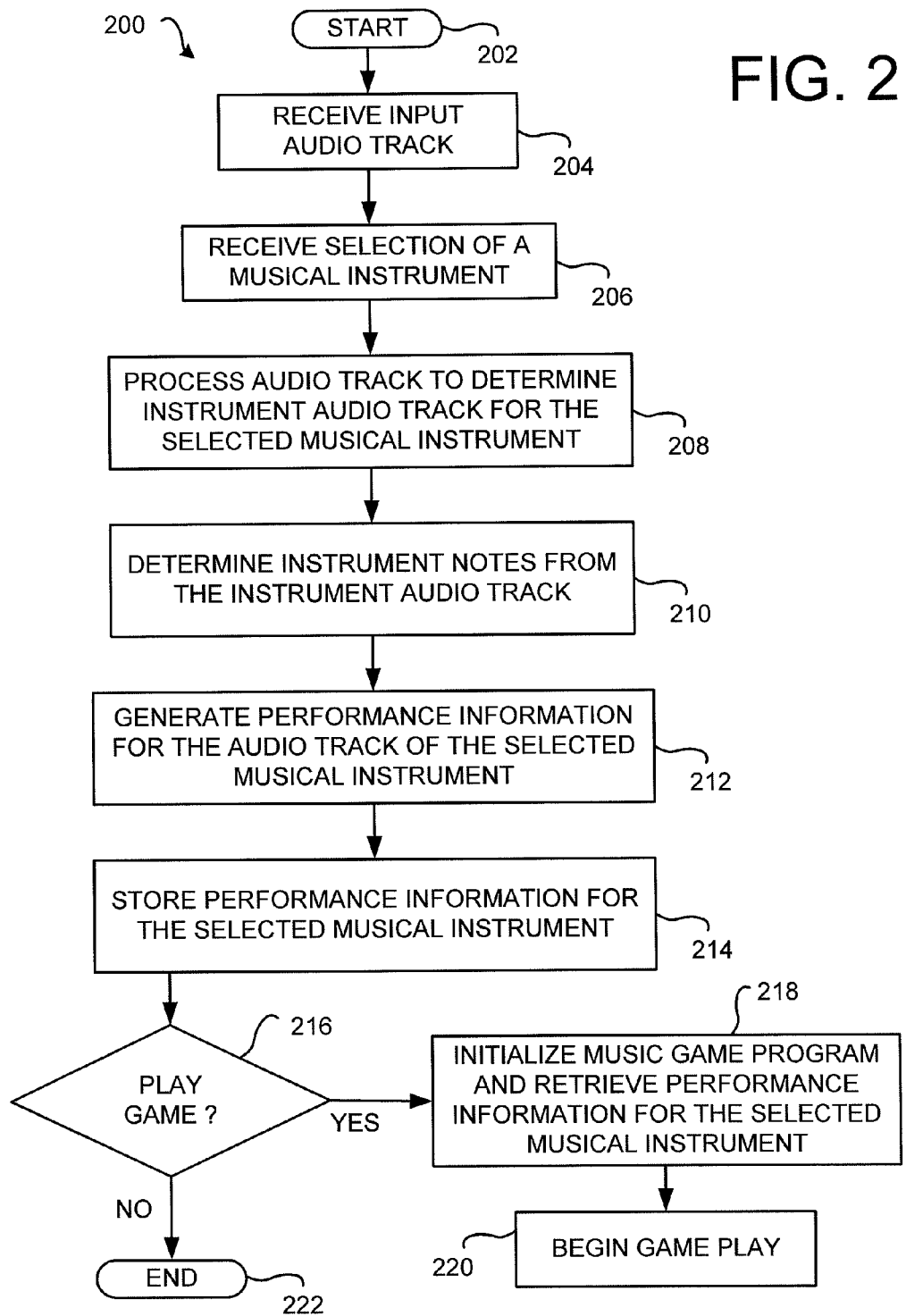
FIG. 2 is a flow chart illustrating an exemplary process of generating game player performance information for a specified audio track of interest.

FIG. 2 is a flow chart 200 illustrating an exemplary process of generating game player performance information for a specified audio track of interest. The flowchart 200 shows the architecture, functionality, and operation of a possible implementation of the software for the game play performance information system 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 2, may include additional functions, and/or may omit some functions. For example, two blocks shown in succession in FIG. 2 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

With respect to FIG. 2, the process 200 starts at block 202, for example, in response to the starting or powering up of the game play performance information system 100 by the game player. At block 204, the specified audio track of interest is received. The specified audio track of interest may be received from any suitable source, such as in the program content streams 132, the audio content stream 138 from the external content source device 136, or from information stored in memory 110. The specified audio track of interest can be characterized by a start time, a duration and/or an end time. Also, the specified audio track of interest will be associated with an identifier, such as a title or the like.

At block 206, a selection of at least one musical instrument of interest is received. It is likely that the audio track of interest has been created using a variety of different musical instruments, such as the guitar that corresponds to the exemplary guitar simulating device 104 of FIG. 1. In addition to sounds from a guitar, the specified audio track of interest may have sounds generated by other musical instruments, such as, but not limited to, drums, a base guitar, a piano, a saxophone, etc. Embodiments of the game play performance information system 100 may be configured to permit the game player to select from among a plurality of different musical instruments. Further, embodiments of the game play performance information system 100 may be configured to permit the game player to select a more than one musical instrument such that corresponding game player performance information is generated for each of the selected musical instruments.

At block 208, the audio track of interest is processed to determine an instrument audio track corresponding to the specified musical instrument(s). For example, if a guitar is the specified musical instrument from block 206, sound characteristics of the audio track of interest is analyzed so as to determine an instrument audio track that corresponds to the sounds (musical notes) generated by the guitar during the original recording of the audio track of interest. If drums are the specified musical instrument from block 206, sound characteristics of the audio track of interest are analyzed so as to identify the instrument audio track generated by the drums.

Further, it is appreciated that the audio track of interest may be divided into a plurality of audio channels. For example, music may be provided in stereo (two au audio channels). Thus, music generated by a specified musical instrument is likely to be found on one of the two stereo sound tracks. As another example, the audio track of interest may be from a movie of the like that is provided on 5.1 surround sound. Here, the music generated by a bass guitar is likely to be found on the sub-woofer channel. Accordingly, embodiments of the game play performance information system 100 may generate game player performance information based upon a particular audio track of the specified audio track of interest.

In some specified audio tracks of interest, there may be multiple instruments that are of the same type. For example, a rock and roll song may have two different guitar players playing in concert with each other during the recording of the specified audio track of interest. It is appreciated that the acoustic characteristics of the two guitars, such as a lead guitar and a rhythm guitar, are different from each other. Thus, the different characteristics of music from the like instruments can be processed to determine an instrument audio track for one or both of the like musical instruments.

Optionally, some embodiments play the generated instrument audio track to the game player for verification. If the game player is satisfied with the nature of the generated instrument audio track, the process proceeds to block 210. If additional processing is required, the process can loop back to block 208 to generate a different instrument audio track or to improve the quality of the instrument audio track.

Any suitable audio processing systems and methods that are operable to define the instrument audio track from the audio track of interest may be used in the various embodiments. Some embodiments may use different audio processing systems and methods acting in cooperation with each other to generate the instrument audio track. Some embodiments may use a particular audio processing system and method to generate an instrument audio track for one type of specified musical instrument, and may use a second particular audio processing system and method to generate an instrument audio track for another type of specified musical instrument.

At block 210, instrument notes are determined from the instrument audio track for the selected musical instrument. Thus, the instrument audio track for the specified musical instrument is parsed out into individual musical notes. Accordingly, the series of instrument notes correspond to, and hence define, the instrument audio track for that particular specified instrument. Any suitable audio processing systems and methods that are operable to define the instrument notes from the instrument audio track may be used in the various embodiments. Accordingly, a series of instrument notes correspond to, and hence define, the instrument audio track for that particular specified instrument.

At block 212, game player performance information is determined from the instrument notes. The game player performance information comprises a series of determined game play notes. Game play notes correspond to the various controllers on the instrument simulation device 104. Thus, the game play notes define which controllers the game player must actuate when playing the music game.

For example, if the selected musical instrument is the lead guitar, then the instrument audio track corresponding to the playing of the lead guitar in the specified audio track of interest is used to generate a series of instrument notes. Then game play notes corresponding to the lead guitar instrument notes played by the musician who recorded the specified audio track of interest are generated. Thus, individual game play notes correspond to the instrument notes of the lead guitar.

Other characteristics of the game play notes may correspond to other characteristics of corresponding instrument notes of the audio instrument track. For example, game play notes are spaced apart from each other so as to correspond to the timing of the playing of the lead guitar notes. Also, the duration of the game play note may correspond to a duration of the instrument note.

In some situations, there may not be a sufficient number of controllers on the instrument simulation device 104 to correspond to all possible instrument notes generated by the actual musical instrument. For example, an instrument simulation device 104 corresponding to a guitar may only have three fret buttons 152. Accordingly, a single game note may have to correspond to a plurality of different instrument notes generated by a musical instrument.

Further, game play notes may be associated with multiple controllers of the instrument simulation device 104 which are used to generate a device game play note. A device game play note is the "virtual" note that is generated as a result of the game player actuating one or more of the controllers on their instrument simulation device. For example, if the instrument simulation device 104 corresponds to a piano, then a device game play note may be generated by actuation of a single controller which emulates a single corresponding key of the piano keyboard. On the other hand, if the instrument simulation device 104 corresponds to a guitar, then in addition to actuation of an appropriate one of the fret buttons 152, the game player must also actuate the strum pad 154 at a correct time so as to cause the fret button 152 and the strum pad 154 to cooperatively generate a device game play note that corresponds to the instrument note of the generated guitar instrument audio track.

The individual game play notes are then assembled together to define the game player performance information. The game player performance information may include other information, such as information identifying the particular musical game that may be played, the type of musical instrument that the game player performance information corresponds to, and/or the title of the audio track of interest. Any suitable information may be included in the game player performance information.

Further, game player performance information may vary from one music game to the next. For example, a instrument simulation device 104 for a first music game may be a guitar simulator with three fret buttons on its neck. In contrast, the instrument simulation device 104 for a second music game may also be a guitar simulator, but with four fret buttons on its neck. Thus, the game player performance information must be different for the first music game and the second music game since the game play notes for the first music game is predicated on three fret buttons and the game play notes for the second music game is predicated on four fret buttons. Accordingly, if an embodiment of the game play performance information system 100 supports multiple musical games, then the game player performance information must be tailored to be compatible with the format of the game player performance information for a specified musical game program.

At block 214, the game player performance information is stored into the performance information 128 region of memory 110 (FIG. 1). If multiple sets of game player performance information are generated for different specified musical instruments, the game player performance information may be associated with each other. For example, some embodiments may be configured to simultaneously generate a plurality of game player performance information associated with multiple selected musical instruments. Other embodiments may generate the plurality of game player performance information associated with multiple selected musical instruments in a serial fashion where the audio track of interest is processed each time a single instrument audio track, game play notes, and/or game player performance information is generated for each particular specified musical instrument.

At block 216, a determination is made whether the game player wishes to pay the musical game. If so (the YES condition), the process proceeds to block 218 wherein the music game play program is retrieved and executed to initiate game play. The musical game will likely require various initialization parameters from the game player, such as a specification of an audio track of interest that will be played and/or the musical instrument that is to be simulated during game play. In response to providing such initialization information, the appropriate game player performance information is retrieved from the memory 110. At block 220, game play begins.

However, if at block 216, the game player does not wish to play the music game (the NO condition), the process proceeds to block 222 and ends. Thus, game player performance information for one or more instrument simulation devices 104 can be generated and saved for later game playing.

Figure 3:
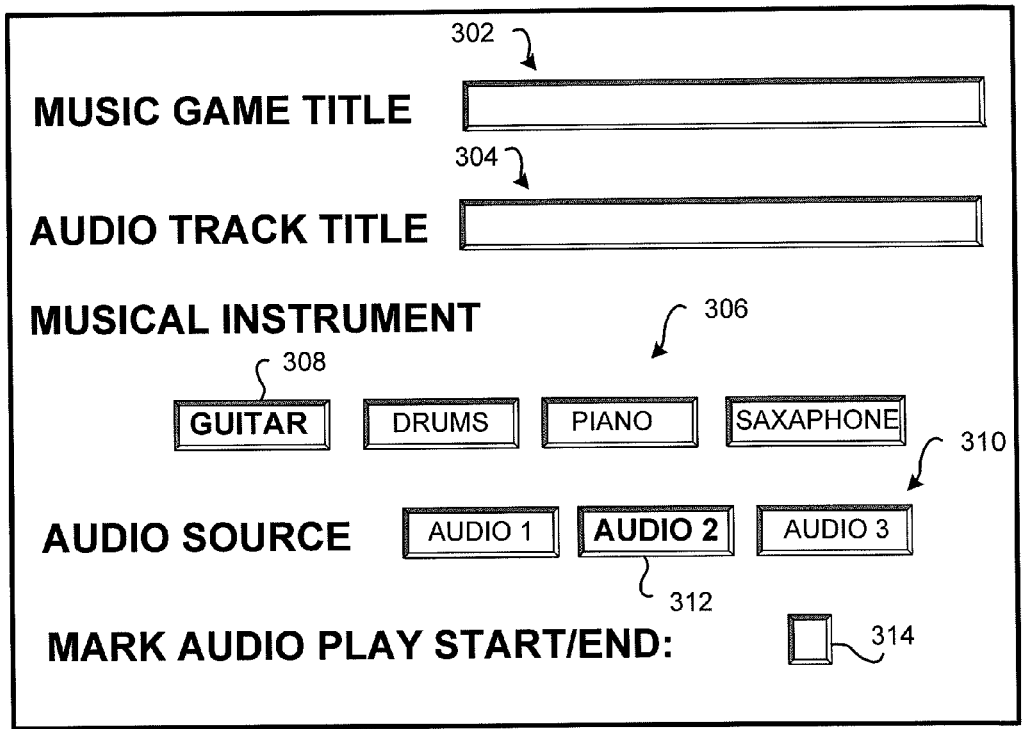
FIG. 3 is a diagram of an exemplary game play graphical user interface (GUI)

FIG. 3 is a diagram of an exemplary game play GUI 142. The game play GUI 142 facilitates control of the game play performance information system 100 by a game player when game player performance information for an audio track of interest is generated. A region 302 on the game play GUI 142 is provided wherein the game player specifies the title of the music game. For example, some embodiments of the game play performance information system 100 support a plurality of different musical games. Each of the different musical games use game player performance information that uses game player performance information for the playing of a particular instrument simulation device 104, such as a guitar. However, the format of the game player performance information may be different between the various music games for any particular selected musical instrument. Accordingly, once the game player specifies the music game that will be played, the game play performance information system 100 can generate game player performance information formatted for that particular music game.

In some embodiments, the region 302 may be omitted if the embodiment of the game play performance information system 100 is specifically tailored to play with a single musical game. Alternatively, a plurality of selectable virtual buttons may be provided, wherein each one of the selectable virtual buttons corresponds to one if a plurality of musical games that the game play performance information system 100 is specifically tailored to play with.

An audio track of interest must be identified and associated with its corresponding game player performance information so that when game play begins, the proper audio track can be played while the game player operates their instrument simulation device 104 during game play. Here, the game player fills in the region 304 with a title or other suitable identifier of the audio track of interest.

The game player must specify the type of musical instrument that the game player performance information is to correspond to. Here, a plurality of selectable virtual buttons 306 are provided, each with text identifying the musical instrument that will be simulated. To illustrate, the game player has navigated to and selected the "Guitar" button 308. Thus, when the audio track of interest is processed, an instrument track corresponding to a guitar will be generated. The game player performance information will be generated from the guitar instrument audio track.

Different audio sources may be used to receive an audio track of interest. For example, with respect to FIG. 1, the media device 102 may receive an audio track of interest from the program content streams 132 or from the audio content stream 138 provided from the external content source device 136. Here, a plurality of selectable virtual buttons 310 are provided, each with text identifying a particular audio input source. To illustrate, the game player has navigated to and selected the "Audio 2" button 312. Thus, when the audio track of interest is processed, the audio track being received on the "Audio 2" input source will be used to generate the game player performance information.

The game play GUI 142 may be configured to include such information as necessary so that the game player may operate the game play performance information system 100. Any suitable look and feel of the game play GUI 142 may be used by the various embodiments of the game play performance information system 100.

Some embodiments are configured to generate the game player performance information from an audio track of interest that is a portion of a movie audio track, the game play GUI 142 displays a virtual button 314 that the game player actuates to indicate the beginning of the audio track of interest. The same virtual button 314, or a different virtual button (not shown), would be actuated by the game player to indicate the end of the audio track of interest. For example, the game player could actuate the virtual button 314 while they are listening to the movie audio track while the movie is being played on the media device 102 or the media presentation device 134. Thus, the game player performance information can be generated based upon the specified start and end of the portion of the movie audio track. Further, the identified portion of the movie audio track may be saved for later game play.

Further, the corresponding video portion of the movie may be saved. Thus, when the game player is playing a game based upon the audio portion of the movie audio track, the corresponding portion of the video track can be presented to the game player on the display 140, for example.

Some embodiments are configured to generate the game player performance information from an audio track of interest that is an audio only channel of the program content stream received from the external content source device 136, such as provided by a music station or a radio station. In other applications, the audio track of interest may be received from a music playback device, such as, but not limited to, a stereo, a compact disc (CD), a personal media device, a record player, or the like, that is communicatively coupled to the media device 102. The game play GUI 142 displays the virtual button 314 that the game player actuates to indicate a first point corresponding to the beginning of the audio track of interest. The same virtual button 314, or a different virtual button (not shown), would be actuated by the game player to indicate a second point corresponding to the end of the audio track of interest. For example, the game player could actuate the virtual button 314 while they are listening to the audio track of interest while it is being played on the music station or radio station. Thus, the game player performance information can be generated based upon the specified start and end of the portion of the received audio only channel. Further, the identified portion of the movie audio track may be saved for later game play.

Figure 4:
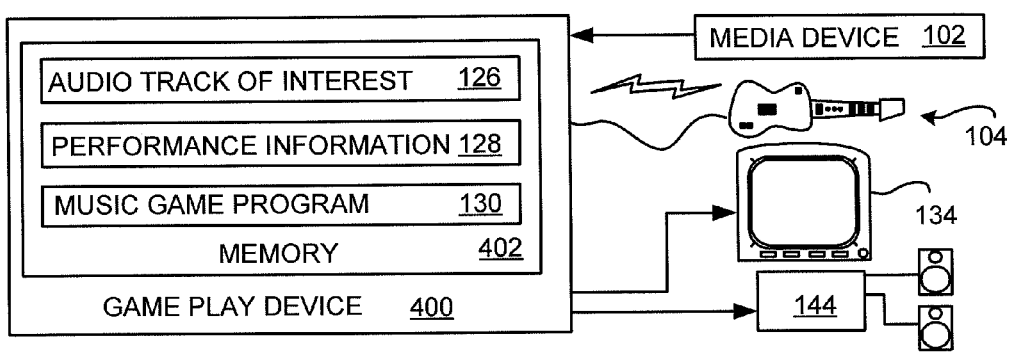
FIG. 4 is a block diagram of a music game play device coupled to a media device having the game play audio track generation system therein.

FIG. 4 is a block diagram of a music game play device 400 coupled to a media device 102 having the game play performance information system 100 therein. Here, the media device 102 has previously generated, and has optionally stored game player performance information, for one or more audio tracks of interest, and/or for one or more selected musical instruments. At some point, the game player performance information is communicated from the media device 102 to the game play device 400, and is then stored in the memory 402 of the game play device 400. In some embodiments, the game player performance information may be communicated to the game play device 400 using an intermediate portable memory medium, such as a compact disc (CD), memory stick, a flash memory, a memory tape, or the like.

It should be emphasized that the above-described embodiments of the game play performance information system 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A method that generates game player performance information associated with audio tracks that are received from at least one of a head end facility, a music station and a radio station that are operated by a media provider, and that are played during a musical game, the method comprising:
   receiving a specification indicating a first point in a selected one of the received plurality of audio tracks that corresponds to a beginning of an audio track of interest;
   receiving a specification indicating a second point that corresponds to an ending of the audio track of interest;
   storing the audio track of interest defined by the first point and the second point of the audio track of interest;
   receiving a specification of a musical instrument, wherein the musical instrument corresponds to an instrument simulation device that a game player operates when playing the musical game;
   receiving the specified audio track of interest from at least one of the head end facility, the music station and the radio station;
   analyzing sound characteristics of the audio track of interest to identify sounds produced by different instruments playing on the audio track of interest;
   determining an instrument audio track based upon the analyzed sound characteristics of the audio track of interest, wherein the instrument audio track is determined from sounds corresponding to music played by the specified musical instrument during recording of the audio track of interest;
   determining a series of instrument notes based upon the instrument audio track, wherein the series of instrument notes correspond to the sounds generated by the specified musical instrument of the instrument audio track;
   generating a series of game play notes based upon the determined series of instrument notes, wherein each of the game play notes correspond to at least one of a plurality of controllers on an instrument simulation device; and
   generating game player performance information based upon the game play notes, wherein the game player performance information identifies a sequence of specific player actions for the game player to make on the plurality of controllers on the instrument simulation device during playback of the audio track of interest.

2. The method of claim 1, further comprising:
   generating a game play graphical user interface (GUI), wherein the game play GUI is operable to receive the specification of the audio track of interest and the specification of the musical instrument.

3. The method of claim 2, further comprising:
   communicating the game play GUI to a media presentation device that is configured to present the game play GUI on a display of the media presentation device.

4. The method of claim 2, further comprising:
   displaying the game play GUI on a display.

5. The method of claim 1, further comprising:
   receiving the audio track of interest at a set top box configured to receive media content, wherein the set top box determines the instrument audio track, generates the instrument notes, generates the game play notes, and generates the game player performance information.

6. The method of claim 5, wherein storing the generated game player performance information comprises:
   storing the generated game player performance information in a memory of the media device.

7. The method of claim 5, wherein storing the generated game player performance information comprises:
   communicating the generated game player performance information to a game play device, wherein the game player performance information is storable in a memory of the game play device.

8. The method of claim 1, further comprising:
   receiving a movie comprising a movie audio track;
   receiving a specification indicating a first point in the movie audio track that corresponds to a beginning of the audio track of interest;
   receiving a specification indicating a second point in the movie audio track that corresponds to an ending of the audio track of interest;
   generating the game player performance information based upon the first point and the second point of the movie audio track; and
   storing a portion of the movie audio track defined by the first point and the second point of the movie audio track.

9. The method of claim 8, further comprising:
   receiving a movie video track corresponding to the received movie audio track; and
   storing a portion of the received movie video track, wherein the portion of the received movie video track corresponds to the portion of the received movie audio track defined by the first point and the second point.

10. The method of claim 1, further comprising:
    receiving an audio track from a music playback device;

receiving a specification indicating a first point in the audio track that corresponds to a beginning of the audio track of interest;

receiving a specification indicating a second point in the audio track that corresponds to an ending of the audio track of interest;

generating the game player performance information based upon the first point and the second point of the audio track; and storing the audio track defined by the first point and the second point of the audio track received from the music playback device.

11. The method of claim 1, wherein analyzing sound characteristics, determining the instrument audio track, determining the series of instrument notes, generating the series of game play notes, and generating game player performance information is performed by a set top box comprising a tuner, wherein the tuner is configured to receive the audio track of interest.

12. A game play performance information system, comprising:

a program content stream interface configured to receive at least a plurality of audio tracks from at least one of a head end facility, a music station and a radio station that are operated by a media provider;

a memory; and a processor system communicatively coupled to the program content stream interface and the memory, and configured to:

receive a specification indicating a first point in a selected one of the received plurality of audio tracks that corresponds to a beginning of an audio track of interest received from at least one of the head end facility, the music station and the radio station;

receive a specification indicating a second point that corresponds to an ending of the audio track of interest received from at least one of the head end facility, the music station and the radio station;

store the audio track defined by the first point and the second point of the audio track received from at least one of the head end facility, the music station and the radio station;

and wherein the processor system, based upon the first point and the second point of the audio track received from at least one of the head end facility, the music station and the radio station, is further configured to, receive a specification of a musical instrument, wherein the musical instrument corresponds to an instrument simulation device that a game player operates when playing a musical game;

analyze sound characteristics of the audio track of interest to identify sounds produced by different instruments playing on the audio track of interest;

determine an instrument audio track based upon the analyzed sound characteristics of the audio track of interest, wherein the instrument audio track is determined from sounds corresponding to music played by the specified musical instrument during a recording of the audio track of interest;

determine a series of instrument notes based upon the instrument audio track, wherein the series of instrument notes correspond to the sounds generated by the specified musical instrument of the instrument audio track;

generate a series of game play notes based upon the determined series of instrument notes, wherein each of the game play notes correspond to at least one of a plurality of controllers on the instrument simulation device; and generate game player performance information based upon the game play notes, wherein the game player performance information identifies a sequence of specific player actions for the game player to make on the plurality of controllers on the instrument simulation device during playback of the audio track of interest.

13. The game play performance information system of claim 12, wherein the processor system is further configured to:

generate a game play graphical user interface (GUI), wherein the game play GUI is operable to receive the specification of the audio track of interest and the specification of the musical instrument.

14. The game play performance information system of claim 12, further comprising:

an external device interface communicatively coupled to the processor system and configured to receive the plurality of audio tracks from a remote source.

15. The game play performance information system of claim 14, wherein at least one of the program content stream interface and the external device interface is configured to receive a movie comprising a movie video track and a movie audio track, wherein the processor system is further configured to:

receive a specification indicating a first point in the movie audio track that corresponds to a beginning of the audio track of interest;

receive a specification indicating a second point in the movie audio track that corresponds to an ending of the audio track of interest;

generate the game player performance information based upon the first point and the second point of the movie audio track;

store a portion of the movie audio track defined by the first point and the second point of the movie audio track; and store a portion of the movie video track, wherein the portion of the movie video track corresponds to the portion of the movie audio track defined by the first point and the second point.

16. The game play performance information system of claim 14, wherein the external device interface receives the plurality of audio tracks from at least one of the music station and the radio station.

17. The game play performance information system of claim 12, wherein the program content stream interface is configured to receive a movie comprising a movie video track and a movie audio track received from the head end facility operated by the media provider, wherein the processor system is further configured to:

receive a specification indicating a first point in the movie audio track that corresponds to a beginning of the audio track of interest;

receive a specification indicating a second point in the movie audio track that corresponds to an ending of the audio track of interest;

generate the game player performance information based upon the first point and the second point of the movie audio track;

store a portion of the movie audio track defined by the first point and the second point of the movie audio track; and store a portion of the movie video track, wherein the portion of the movie video track corresponds to the portion of the movie audio track defined by the first point and the second point.

18. A method that generates game player performance information associated with audio tracks played during a musical game, the method comprising:
- receiving an audio track with a plurality of musical scores and songs thereon from at least one of a head end facility, a music station and a radio station that are operated by a media provider;
- receiving a specification indicating a first point in the audio track that corresponds to a beginning of portion of an audio track of interest;
- receiving a specification indicating a second point in the audio track that corresponds to an ending of the portion of the audio track of interest;
- receiving a specification of a musical instrument, wherein the musical instrument corresponds to an instrument simulation device that a game player operates when playing the musical game;
- analyzing sound characteristics of the audio track of interest to identify sounds produced by different instruments playing on the portion of the audio track of interest defined by the first point and the second point;
- determining an instrument audio track based upon the analyzed sound characteristics of the portion of the audio track of interest, wherein the instrument audio track is determined from sounds corresponding to music played by the specified musical instrument in the portion of the audio track of interest;
- determining a series of instrument notes based upon the instrument audio track, wherein the series of instrument notes correspond to the sounds generated by the specified musical instrument of the instrument audio track;
- generating a series of game play notes based upon the determined series of instrument notes, wherein each of the game play notes correspond to at least one of a plurality of controllers on the instrument simulation device; generating the game player performance information based upon the audio track of interest defined by the first point and the second point; and
- storing a portion of the audio track of interest defined by the first point and the second point of the audio track received from at least one of the head end facility, the music station and the radio station.

19. The method of claim 18, wherein receiving the audio track comprises:
- receiving a movie comprising a movie audio track, wherein the audio track of interest corresponds to a portion of the movie audio track defined by the first point and the second point of the movie audio track.

20. The method of claim 19, further comprising:
- receiving a movie video track corresponding to the received movie audio track; and
- storing a portion of the movie video track, wherein the portion of the movie video track corresponds to the portion of the movie audio track defined by the first point and the second point.

21. The method of claim 18, wherein receiving the audio track comprises:
- receiving the audio track from an external content source device.

* * * * *